Patented May 27, 1930

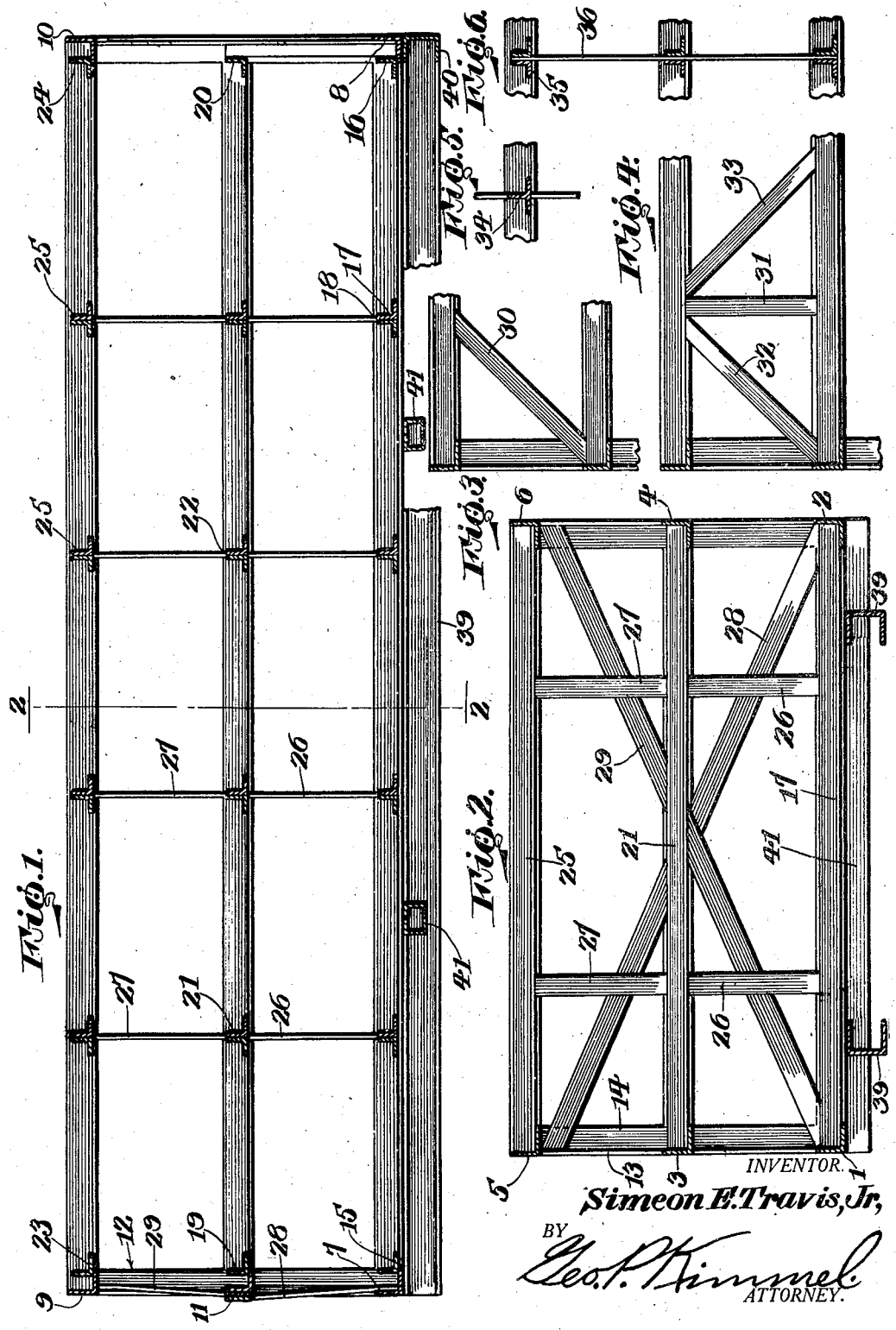

1,759,876

UNITED STATES PATENT OFFICE

SIMEON E. TRAVIS, JR., OF HATTIESBURG, MISSISSIPPI

TRUCK BODY

Application filed October 22, 1928. Serial No. 314,151.

This invention relates to a truck body of that type designed primarily for transporting cased bottles, but it is to be understood that a truck body in accordance with this invention may be employed for transporting any type of freightage for which it is found applicable, and the invention has for its object to provide, in a manner as hereinafter set forth a truck body of the plural deck type having new, novel and improved means for not only reinforcing the body and forming the decks, but further for sustaining the upper decks.

Further objects of the invention are to provide, in a manner as hereinafter set forth a truck body of the plural deck skeleton type which is simple in its construction and arrangement, strong, durable, compact, conveniently loaded and unloaded, preventing the abutting of the cases on a deck during transportation or in other words reducing the shifting of the load lengthwise of the truck to a minimum when travelling, readily assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications may be resorted to which fall within the scope of the claims hereunto appended.

In the drawings wherein like reference characters denote corresponding parts throughout the several views:

Figure 1 is a longitudinal sectional view, partly broken away of a truck body in accordance with this invention.

Figure 2 is a section on line 2—2 Figure 1.

Figure 3 is a fragmentary view in sectional elevation of a modified form.

Figure 4 is a fragmentary view in sectional elevation of another modified form.

Figure 5 is a fragmentary view in sectional elevation of still another modified form.

Figure 6 is a fragmentary view in sectional elevation of a further modified form.

The truck body which preferably is of rectangular contour and of the skeleton type includes a pair of oppositely disposed lower, intermediate and upper side rails indicated respectively at 1 and 2, 3 and 4, and 5 and 6, and a pair of oppositely disposed lower and upper end rails indicated respectively at 7 and 8 and 9 and 10.

The truck body further includes an intermediate rear end rail 11 and four vertically disposed corner rails 12 and which are common to the ends of the side and end rails.

Each of the rails is of L-form. The side and end rails have the horiozntal legs extend inwardly with respect to the lower ends of the vertical legs thereof. The horizontal leg of the rail 1 extends towards the horizontal leg of the rail 2. The horizontal leg of the rail 3 extends towards the horizontal leg of the rail 4. The horizontal leg of the rail 5 extends to the horizontal leg of the rail 6. The horizontal leg of the rail 7 extends towards the horizontal leg of the rail 8.

The horizontal leg of the rail 11 extends towards the front end of the truck body. The horizontal leg of the rail 9 extends towards the horizontal leg of the rail 10. The end rails are of materially less length than the length of the side rails. The legs of each corner rail 12 are indicated at 13, 14 and are disposed at right angles with respect to each other. The legs 14 of the corner rails extend towards each other and the legs 13 of the corner rails extend towards each other. The legs 14 are arranged at the sides of the truck body and the legs 13 at the ends thereof.

The vertical legs of the side rails 1, 2, 3 and 4 are welded to the edges of the legs 13 of the corner rails 12 and the horizontal legs of the side rails 1, 2 are welded against the inner faces of the legs 14 of the corner rails 12. The vertical legs of the rails 1, 2 at their ends are cut away so that said rails 1, 2 can abut against the edges of the legs 13 and against the inner faces of the legs 14.

The end rails 7, 8 are welded to the horizontal legs of the side rails and to the legs 14 of the corner rails. The end rails 9, 10 are seated on and welded to the upper end of the corner rails 12. The end rail 11 is welded to the legs 14 of the corner rails 12 and to the horizontal legs of the side rails 3, 4. The side rails 5, 6 are welded to the edges of the legs 13 and to the inner faces of the legs 14 of the corner rails 12.

The end rails 9 and 10 are mounted on and welded to the top of the corner rails 12.

With reference to Figures 1 and 2 the lower deck is formed from the side rails 1, 2, end rails 7, 8, a pair of L-irons 15, 16, and a plurality of spaced pairs of L-irons 17. The L-irons of each pair are oppositely disposed and with the vertical legs abutting to form at their top edges a seat 18. The L-irons 15, 16 are oppositely disposed with respect to each other. The horizontal legs of the L-irons 15, 16 and 17 form supports for the bottle cases, are of less height than the side rails, and extend from the vertical leg of side rail 1 to the vertical leg of side rail 2. The L-iron 15 is secured to the legs 14 of the rear corner rails 12 and the L-iron 16 is secured to the legs 14 of the forward corner rails. The L-irons 15, 16 are secured to the vertical and horizontal legs of the side rails 1, 2 and positioned on said horizontal legs. The horizontal leg of the rear L-iron of the rear pair extends towards the horizontal leg of the L-iron 15 and the horizontal leg of the front L-iron of the other forward pair extends towards the horizontal leg of the L-iron 16. The horizontal legs of the other irons of the front and rear pair extend towards the horizontal legs of adjacent intermediate pairs. The horizontal leg of a rear iron of an intermediate pair extends towards the horizontal leg of a forward iron of a rearward adjacent intermediate pair. The horizontal legs of each pair of spaced opposed L-irons provide coacting supports for a bottle case and the vertical legs of such irons arrest the shifting of the bottle case forwardly and rearwardly in a lengthwise direction with respect to the truck during transportation. The vertical legs of the side rails 1, 2 prevent the bottle cases from shifting off the deck in a direction transversely of the truck. The L-irons 15, 16 and 17 further constitute a bracing means for the side rails of the deck.

The intermediate deck includes the end rail 11, side rails 3, 4, L-irons 19, 20 corresponding to L-irons 15, 16 of the lower deck. The intermediate deck further includes spaced pairs of oppositely disposed L-irons 21 corresponding to the pairs of L-irons 17. The iron 19 and pairs of irons 21 are secured to the side rails 3 and 4 and end rail 11 in the same manner as the irons 15 and 17 are secured to side rails 1, 2 and end rail 7. The iron 20 is secured upon the horizontal leg and to the vertical leg of the side rails 3, 4. The irons 19, 20 and pairs of irons 21 are disposed in the same manner as the irons 15, 16 and 17 and arranged in superposed relation with respect thereto. The seats formed by the vertical legs of the irons 21 are indicated at 22. The irons 19, 20 and 21 perform the same function as the irons 15, 16 and 17 and are of less height than the end rail 11 and side rails 3, 4.

The upper deck includes the end rails 9, 10, side rails 5, 6, L-irons 23, 24 corresponding to L-irons 19, 20 of the intermediate deck. The upper deck further includes spaced pairs of oppositely disposed L-irons 25 corresponding to the pairs of L-irons 21. The irons 23, 24 and pairs of irons 25 are secured to the side rails 5, 6 and end rails 9, 10 in the same manner as the irons 15, 16 and 17 are secured to the side rails 1, 2 and end rails 7, 8. The irons 23, 24 and pairs of irons 25 are disposed in the same manner as the irons 19, 20 and pairs of irons 21 and are arranged in superposed relation with respect thereto. The irons 23, 24 and 25 are of less height than the side rails 5, 6 and end rails 9, 10 and perform the same function as the irons 19, 20 and 21.

With reference to Figures 1 and 2 the pairs of irons 21 are supported intermediate their ends by vertically disposed, spaced brace members 26 which have their lower ends welded to the seats 18 and their upper ends to the lower faces of the horizontal legs of the irons 21. The pairs of irons 21 are supported intermediate their ends by vertically disposed, spaced brace members 27 which have their lower ends welded to the seats 22 and their upper ends to the lower faces of the horizontal legs of the irons 25. The thickness of the brace members 26 and 27 is less than the width of the seats 18 and 22 whereby when welded the joint will not project in the path of the bottle cases.

The rear end of the trunk body is reinforced by a pair of diagonally disposed cross braces 28, 29 which at their centers are secured together. The braces 28, 29 are arranged exteriorly of the end rail 11 and brace 29 is secured to the latter. The braces 28, 29 have their ends secured to the inner faces of the rear corner rails.

The brace members between the decks may be disposed at an inclination and in this connection reference is had to Figure 3 where such form of brace member is shown and indicated at 30.

The brace members between the decks may be disposed vertically and at an inclination and in this connection reference is had to Figure 4 where such arrangement is shown and indicated at 31, 32 and 33.

In lieu of employing a pair of L-irons secured together in abutting relation an inverted T-iron may be used and in this connection see Figure 5 where such form is shown and indicated at 34.

The brace members between the decks may be of a length to extend from the lower, through the intermediate and to the upper deck. The member extending between the vertical legs of the opposed pairs of L-irons, and in this connection see Figure 6 where such an arrangement is shown. The pairs of irons are indicated at 35 and the brace member at 36. The irons and member are welded together.

Further with reference to Figure 1, spaced vertical brace members 37 are interposed between the L-irons 16 and 20. The front end of the truck body is closed by a panel 38.

A sub-structure for the truck body is shown and which is formed by spaced longitudinally extending channel irons 39, a front sill 40 and spaced transversely extending braces 41 extending through the irons 39.

The truck body can be set up with both of its ends solid or closed if desired.

What I claim is:

1. A truck body comprising lower, intermediate and upper side and end rails, vertical corner rails common to the ends of said side and end rails, a plurality of pairs of spaced lower, intermediate and upper transversely extending supports secured respectively to and bracing the lower, intermediate and upper side rails, and bracing means between said lower and intermediate supports and bracing means between said intermediate and upper supports.

2. A truck body comprising lower, intermediate and upper side and end rails, vertical corner rails common to the ends of said side and end rails, a plurality of pairs of spaced lower, intermediate and upper transversely extending supports secured respectively to and bracing the lower, intermediate and upper side rails, and bracing means between said lower and intermediate supports and bracing means between said intermediate and upper supports, each of said supports in the form of an L-iron having vertical and horizontal legs, each bracing means secured to the bottom of a lower support and to the horizontal leg of an upper support.

3. A truck body comprising lower, intermediate and upper side and end rails, vertical corner rails common to the ends of said side and end rails, a plurality of pairs of spaced lower, intermediate and upper transversely extending supports secured respectively to and bracing the lower, intermediate and upper side rails, bracing means between said lower and intermediate supports, and bracing means between said intermediate and upper supports, each of said supports in the form of an L-iron having a vertical and a horizontal leg, said bracing means secured to the top edge of a vertical leg of a lower support and to the lower face of a horizontal leg of an upper support.

4. A truck comprising a body formed of a plurality of decks, each of said decks including side rails and supporting means for the ends of the side rails, and each of said decks further including spaced supports, certain of said supports being of inverted T-shape and the remainder of the supports being of L-shape, said L-shaped supports mounted on the supporting means for the ends of the side rails, the supports of one deck arranged in superposed relation with respect to the supports of the other deck, and spaced, vertically disposed brace members for the inverted T-shaped supports, said brace members extending from the supports of a lower deck to the supports of an upper deck and secured to the supports.

In testimony whereof, I affix my signature hereto.

SIMEON E. TRAVIS, Jr.